United States Patent [19]
Bealor, Jr. et al.

[11] Patent Number: 4,939,697
[45] Date of Patent: Jul. 3, 1990

[54] VARIABLE FOCUSING SONAR

[75] Inventors: Jesse L. Bealor, Jr.; Rufus L. Cook, both of Panama City, Fla.

[73] Assignee: The United States of America as represented by the Secretary of the Navy, Washington, D.C.

[21] Appl. No.: 769,759

[22] Filed: Oct. 22, 1968

[51] Int. Cl.$^5$ .............................................. G01S 15/00
[52] U.S. Cl. ...................................... 367/104; 367/88
[58] Field of Search .................... 340/1, 3, 16 R, 8 L; 343/7 ED, 7.3; 367/104, 138, 106; 342/74

[56] References Cited
U.S. PATENT DOCUMENTS 3,168,659 2/1965 Bayre et al. .......................... 367/150
3,351,895 11/1967 Cupp et al. ........................... 367/106

Primary Examiner—Thomas H. Tarcza
Assistant Examiner—Daniel T. Pihulic
Attorney, Agent, or Firm—Sol Sheinbein; John Becker; Harvey David

[57] ABSTRACT

The received signal from an acoustic echo detection and ranging system is compared with internally generated signals indicating the focus of a variable focus transducer. Logic circuits in the signal comparison channel develop control voltages to focus said transducer upon a predetermined area from which said received signal originates.

10 Claims, 2 Drawing Sheets

JESSE L. BEALOR, JR.
RUFUS L. COOK
INVENTORS

VARIABLE FOCUSING SONAR

The invention described herein may be manufactured and used by or for the Government of the United States of America for governmental purposes without the payment of any royalties thereon or therefor.

This invention pertains to the echo detection and ranging art. In particular, this invention concerns a control system for focusing a transducer or energy directing member of an echo detection and ranging system on a specific predetermined area in the investigative range of said system during movement of said transducer or directing member relative to said specific predetermined area. This invention is applicable to a wide variety of echo detection and ranging systems, but, in the interest of clarity and conciseness, it shall be disclosed, herein, as it pertains to an acoustic energy detection and ranging system. Should the invention be applied to types of echo ranging and detection systems other than acoustic systems, the knowledge necessary to perform the appropriate modifications to certain components of the herein disclosed system would be encompassed by the skills of a proficient artisan working in the pertinent field having the benefit of the teachings of this disclosure. In particular, the present invention is described as incorporated in an underwater sonar system having a specific utility for locating buried objects.

Transmitted power and bottom reverberation are two inportant parameters of design in the construction of buried object sonar systems which must be reconciled. A high transmitter power is required to obtain any appreciable penetration in the bottom due to signal attenuation by the bottom. Such a high power is best obtained from a relatively large transducer. Bottom reverberation, which is undesirable since it masks the echo signal, is directly proportional to the bottom area insonified. Therefore, by making the transducer focusable, the insonified area may be reduced to partially offset the effect of a large insonifying transducer, and, accordingly, provide a more favorable signal-to-noise ratio.

There are several types of focusing transducers, but all require some manipulation to keep a desired zone in focus as relative movement between a selected target zone, i.e., the bottom, and the transducer takes place. This focusing effort is time consuming and divides the attention of the operator between analyzing echo signal returns and focusing the array. The division of attention causes undue strain on operational personnel and increases the chances of making errors in the analysis of the echo signal returns.

With the above state-of-the-art operational conditions in mind, it is an object of this invention to provide a method and means to maintain a transducer focused upon a given area without attention by the operator of the transducer equipped device.

A further object of the invention is the provision of a control mechanism which will maintain an energy director focused upon a selected area despite relative motion therebetween.

A still further object of this invention is the provision of an acoustic transducer focusing mechanism which will maintain said transducer focused upon a selected, predetermined area without manual operator assistance.

Another object of this invention is to provide a control system for an air echo detection and ranging device with means for changing the focus of the transducer of said device to concentrate energy therefrom on a predetermined focal point and additional means for maintaining the transducer focus upon the manually selected focal point.

Another object of this invention is to provide a buried object sonar system with provision for automatic focusing of the transducer upon a predetermined echo-producing object despite range changes therebetween.

Another object of this invention is to provide a control system for focusing a transducer means of an echo detection and ranging device, and supplying signals indicative of the zone of focus of said transducer to the indicator of said device, for display thereon.

Other objects and many of the attendant advantages will be readily appreciated as the subject invention becomes better understood by reference to the following detailed description, when considered in conjunction with the accompanying drawings wherein.

Figure 1:
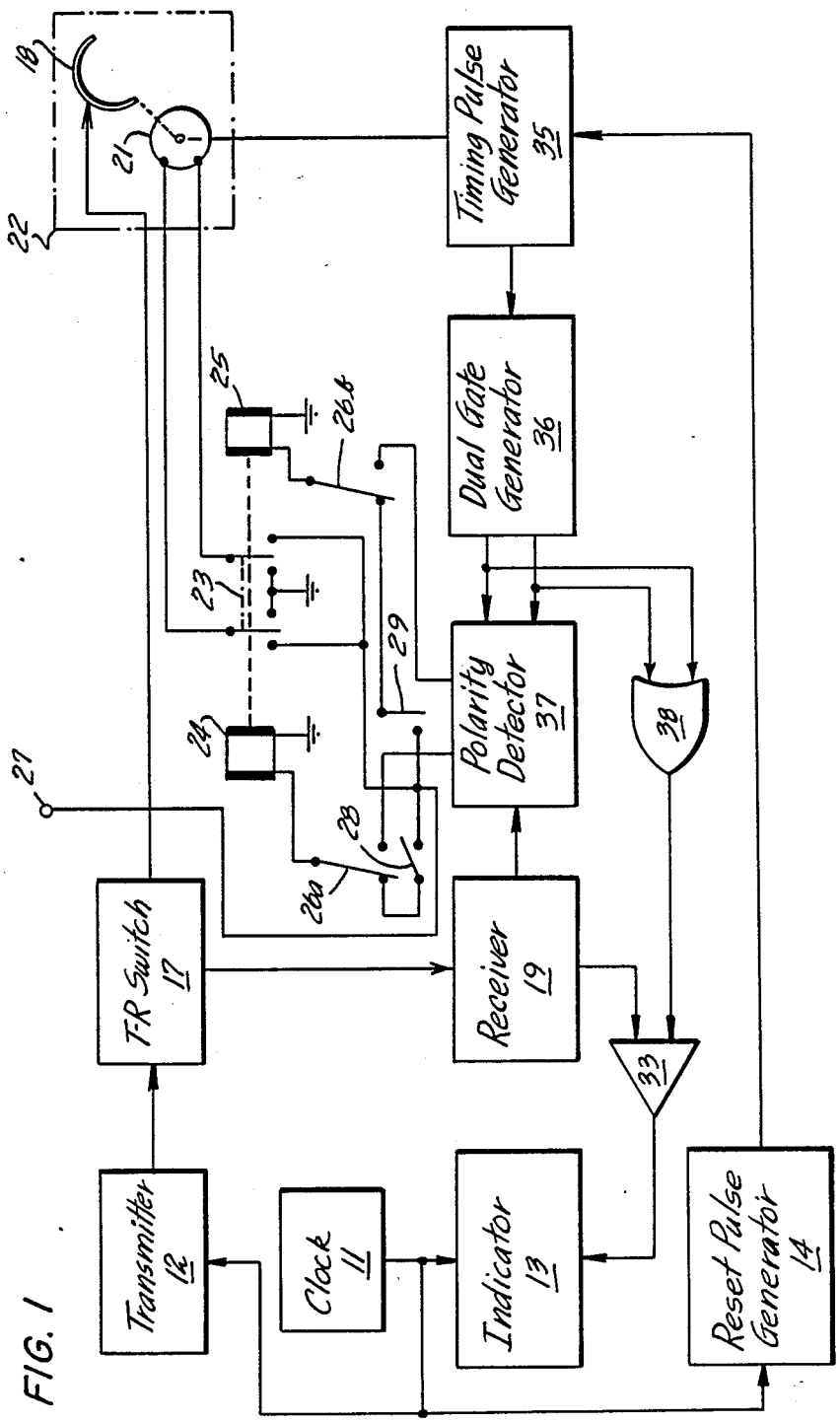
FIG. 1 is a diagrammatic showing of the system of the invention.

As shown at FIG. 1, a clock circuit 11 supplies output signals to a transmitter 12, an indicator 13, and a reset pulse generator 14. The particular circuit configuration of the clock circuit 11, sometimes referred to as a master oscillator, is not shown, since any state-of-the-art oscillator which is capable of delivering an accurately timed train of pulses 15, as illustrated at FIG. 2a, may be employed.

Figure 2:
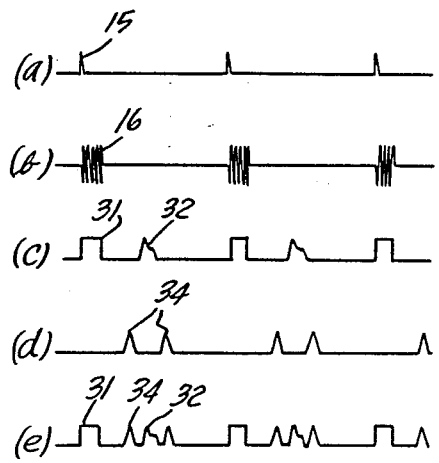
FIG. 2 illustrates five waveforms, labeled a through e, to aid in the explanation of FIG. 1.

FIG. 2 is seen to illustrate a series of waveforms. The individual traces shown therein correspond to a voltage/time display taken at various points in the system of FIG. 1. Two and a fraction cycles of operation are illustrated. The various waveforms; labeled a, b, c, d, and e; will be referred to in the continuing explanation of FIG. 1 to facilitate a person skilled in the electronic arts in the understanding thereof.

In response to pulses 15 from clock circuit 11, transmitter 12 produces acoustic frequency pulses 16, see FIG. 2b. Acoustic frequency refers to the frequencies of the order of magnitude useful in generating compressional waves for echo detection and ranging systems, i.e., 18 Khz to 1 Mhz. A transmit-receive switch 17 applies these frequency pulses 16 to a variable focus transducer 18, while protecting receiver from overload damage therefrom. Transmitter 12, transmit-receive switch 17, and receiver 19 may be chosen from conventional state-of-the-art devices, and, accordingly, are not described in detail.

In a like manner, variable focus transducer 18, hereafter termed VFT 18, may be of any suitable state-of-the-art construction which is adaptable to the particular operational environment. Suitable types may include, for example, a deformable array of piezoelectric elements, linear arrays with movable sections, and transducers combined with a variable focus acoustic lens. As shown the VFT 18 is reversible, i.e., used for both transmission and reception, but other arrangements may be employed, if desired. When the receiving hydrophone is separate from the transmitting transducer, transmit-receive switch 17 may be omitted, and some other form of overload protection for receiver 19 provided.

A particular construction for VFT 18, which is especially effective for the acoustic underwater ranging system, is disclosed in our copending U.S. patent application, Ser. No. 726,871, filed May, 6, 1968, entitled "Variable Focus Electroacoustical Transducer". Basically this is a flexible array of piezoelectric electroacoustic elements. The transducer is deformable in a curved configuration to concentrate the acoustic energy upon, and intercept divergent energy from, a predetermined area. For purposes of brevity, VFT 18 is disclosed as being curved in a single plane, but it should be understood that a controlled deformation could be produced in more than a single plane, so as to effect a three dimensional focus, if desired. Alternatively, a separate hydrophone transducer could be used in a receiver arrangement constructed so as to be curved within a second plane angularly disposed to the plane of the sonifying transducer.

A reversible electric motor 21 is mechanically connected to VFT 18 so as to selectively alter the focus thereof. If desired, VFT 18 together with electric motor 21 may be separately housed by suitable housing means, shown schematically by enclosure 22. Any housing means, as is conventional for the application, may be used for this purpose, including towed bottom following vehicles, hull mounted sonar domes, and the like.

The direction of rotation of electric motor 21 is determined by the position of an electromagnetically operated switch device 23. Switch device 23 is of a double pole double throw circuit configuration, spring biased to a neutral center position. Activation of either solenoid 24 or 25 is effective to operate one throw or the other of switch device 23. Solenoids 24 and 25, together with switch device 23, may be advantageously combined into a unitary electromagnetic relay, if desired. The source of energization potential for solenoids 24 or 25 is determined by the position of a double pole double throw "mode" switch 26 (individual sections of which are labeled 26a and 26b in FIG. 1), electrically connected thereto. Switch 26 is termed a "mode" switch because the operation thereof determines whether motor 21 focuses transducer in response to manually initiated signals or in response received echo signals. In the position shown, the electrical energy comes from a suitable power source, not shown, via terminal 27, and to solenoid 24 through "out" switch 28, or to solenoid 25 through "in" switch 29. Switches 28 and 29 serve to change the focus of VFT 18 in either of the desired directions upon actuation, if switch 26 is in the position illustrated, termed "manual position".

In operation, receiver 19 processes returned signals received from VFT 18 and transmit-receive switch 18 to produce a voltage waveform as shown at FIG. 2c. The waveform shown displays a volume reverberation component 31, which closely corresponds to the frequency pulse 16, and a return signal 32. These waveforms, which are typical for a sonar system of this type, are fed to a suitable amplifier 33. Also fed to amplifier 33 are a pair of gate pulses 34 (see FIG. 2d), indicative of the range focus of VFT 18, the derivation of which is to be presently described. Amplifier 33 combines the received waveform of FIG. 2c with the gate pulses of FIG. 2d and feeds the composite waveform, as shown in FIG. 2e, to indicator 13, which, if desired, presents the image as an "A" scan, or range-amplitude presentation. Other types of indicators may be used, of course, if other presentations are desired. When VFT 18 is properly focused, gate signals 34 appear on either side of return signal 32, as illustrated. If this proper focus condition is not obtained, "out" switch 28 or "in" switch 29 are actuated to properly focus VFT 18.

If the return signal 32 is properly focused, it will lie between gate pulses 34 on the display, as shown at FIG. 2e. Should the return signal 32 lie outside the zone of focus, either switch 28 or 29 is closed to change the focus of VFT 18 to bracket return signal 32 with focus indicating gate pulses 34. When this condition is obtained, mode switch 26 may be placed in the opposite position to cause the system to maintain VFT 18 focused upon the range zone producing return signal 32.

Reset pulse generator 14 produces a reset pulse of predetermined shape and polarity at the beginning of each cycle of operation of the system in the same fashion as transmitter 12 produces audio frequency pulses 16 and in response to receiving a signal or a predetermined number of signals from clock 11. The reset pulse is fed to a timing pulse generator 35 which produces an output signal, i.e., a timing pulse, after a predetermined time interval which is determined by the configuration, and hence the focus, of VFT 18. The timing pulse output of timing pulse generator 35 is fed to a dual gate generator 36. Gate pulses 34 are produced by the dual gate generator 36 and are fed therefrom to a polarity detector circuit 37 and to an "or" gate 38 which combines the separate gate pulses 34 into a single signal. Polarity detector 37 receives the return signal 32 from receiver 19 in addition to the gate pulses 34, and energizes either solenoid 24 or 25 upon simultaneous receipt of the return signal 32 and one of the gate pulses 34. It is seen that this selective energization of either solenoids 24 or 25 causes motor 21 to adjust the focus of VFT 18 to restore the time separation of the gate pulses 34 and received signal.

Figure 3:
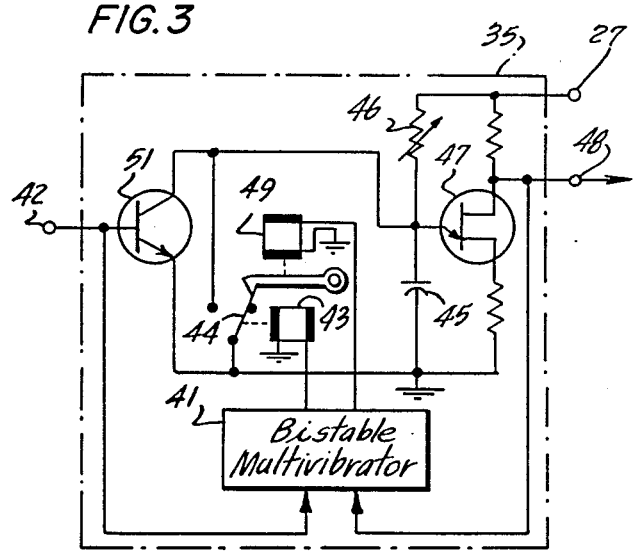
FIG. 3 is a schematic representation of an exemplary construction of the timing pulse generator shown in FIG. 1.

Referring now to FIG. 3, timing pulse generator 35 is seen to include a bistable multivibrator 41 which is fed a signal from reset pulse generator 14, via terminal 42. Bistable multivibrator 41, upon receipt of the signal from reset pulse generator 14, energizes solenoid 43 of a latching relay to open contact 44 to the position shown and break a discharge path for capacitor 45. Capacitor 45 charges through a variable resistance 46 connected to a suitable voltage supply, which may be, as shown, that appearing at terminal 27. Upon capacitor 45 attaining a predetermined voltage, unijunction transistor 47 conducts to discharge capacitor 45 and thereby produce an output signal which is coupled to bistable multivibrator 41, as well as to terminal 48. The output signal coupled to bistable multivibrator 41 is effective to cause the device to assume the opposite conduction state, and, through appropriate output connections, energize the latching solenoid 49. By this action, contact 44 is closed to short circuit capacitor 45 and thereby assure that there are no further output signals prior to the receipt of the next pulse from reset pulse generator 14. Should resistance 46 be set to such a value that the charge on capacitor 45 does not attain the predetermined value necessary to trigger transistor 47 during a single duty cycle, transistor 51, which is connected so as to be in parallel with contact 44 and energized by reset signals via terminal 42, discharges capacitor 45 to assure the charge cycle thereof is in synchronism with the operation of transmitter 12.

Variable resistance 46 is mechanically connected to motor 21 in such a manner as to have its resistance altered thereby as the focus of VFT 18 is altered. The value of variable resistance 46 and the coupling thereof to motor is chosen such that the output signal from transistor 47 occurs at a time after the firing of transmitter corresponding to the range of the nearer boundary of the zone of focus. To avoid the use of the watertight mechanical seals, enclosure 22 may contain variable resistor 46, or the entire timing pulse generator circuit 35, if desired. In place of a rotary motion variable resistance, variable resistors 46 may be of the strain gate type. In such case, the variable resistance may be mounted directly on the backing of VFT 18.

Figure 4:
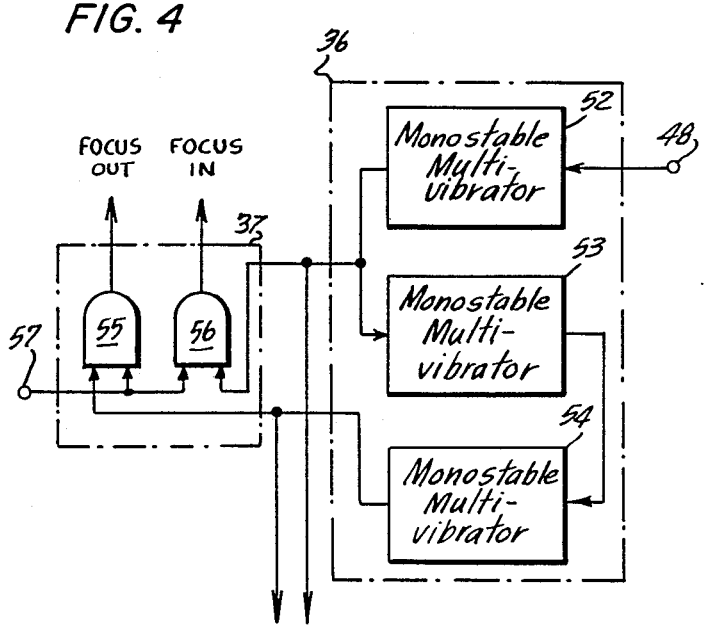
FIG. 4 shows, in greater detail, the dual gate generator and polarity detector components, and how they cooperate.

FIG. 4 shows in greater detail the preferred arrangement of dual gate generator 36 and the polarity detector 37. The output signal from the timing pulse generation 35 is supplied, via terminal 48, to a monostable multivibrator 52 having a predetermined cycle and recovery time chosen so as to produce the desired pulse width for gate pulse 34. The output of monostable multivibrator 52, gate pulse 34, is supplied, via conventional circuitry, to polarity detector 37, to "or" gate 38 (see FIG. 1), and to a second monostable multivibrator 53. The cycle and recovery time of monostable multivibrator 53 is chosen to produce an output signal having a time duration corresponding to the range extent of the zone of focus. Monostable multivibrator 53 triggers a third monostable multivibrator 54 which, like monostable multivibrator 52, has a cycle and recovery time chosen as to produce the second pulse gate 34. The output of monostable multivibrator 54 is coupled, via conventional circuitry, to polarity detector 37, and to "or" circuit 38.

Polarity detector 37 is seen to comprise "And" circuits 55 and 56. "And" circuit 55 receives inputs from receiver 19, via terminal 57, and monostable multivibrator 54. When these two inputs arrive simultaneously, i.e., the received signal 32 at the furthermost bountry of the zone of focus, an output is fed to solenoid 24 causing motor 21 to change the focus of VFT 18 in a direction to increase the range of the zone of focus. When the received signal 32 coincides with the second pulse gate 34 from monostable multivibrator 54, "And" gate 56 provides an output to solenoid 25 effective to cause rotation of motor 21 in a direction to focus the VFT 18 as a shorter range. As long as received signal 32 lies between the gate pulses 34, there is no output from polarity detector 37 to cause operation of motor 21.

The precise construction of the multivibrator circuits referenced at 41, 52, 53, and 54 are not shown, since they may be of any conventional construction. For example, the construction of the circuits may employ solid state devices and be in conformity with the design practice outlined in the G.E. Transistor Manual, 7th edition, 1964, General Electric Co., Syracuse, N.Y. Similarly, a solid state latching switch circuit may be employed in place of solenoids 43 and 49 and contact 44 in the timing pulse generator, if desired.

From the above complete and concise disclosure, it may be seen that the present invention provides an echo detection and ranging system having improved operational characteristics and meeting the aforerecited objects of invention. Further, it is seen that the above detailed exemplary embodiment teaches the skilled worker, versed in the current state-of-the-art to make and use the invention.

What is claimed is:

1. An echo detection and ranging system comprising:
   timing means to produce a series of timed electrical pulses for synchronously triggering various components of said system;
   transmitter means electrically connected to said timing means for producing electrical pulses of a predetermined frequency in response to said timed pulses;
   focusable transducer means electrically connected to said transmitter means for converting said electrical pulses into investigative energy pulses and for focusing said investigative pulses on a predetermined area;
   receiver means electrically connected to said focusable transducer for processing return echo signals reflected by objects struck by said investigative energy pulses;
   indicator means electrically connected to said receiver means for display of said processed echo signals and to said timing means for synchronous operation thereby;
   pulse generator means effectively connected to said focusing transducer and said timing means for generating an electrical pulse at timed intervals corresponding to the range of the area upon which said investigative energy pulses are focused and having the output thereof connected to said indicator means for display of said range pulses thereon;
   focus changing means mechanically connected to said focusable transducer means for changing the focal point thereof in response to predetermined electrical supply conditions; and
   circuit means electrically connected to said focus changing means for supplying electrical signals thereto in accordance with predetermined conditions for altering the focus of said focusing transducer means in a predetermined manner.

2. An echo detection and ranging system according to claim 1 in which said pulse generator means comprises a plurality of serially connected monostable multivibrator circuits.

3. An echo detection and ranging system according to claim 1 in which said focus changing means comprises a reversible electric motor.

4. An echo detection and ranging system according to claim 1 in which said circuit means comprises electrically actuated switch means to effect the desired focus of said transducer means in response to said predetermined conditions.

5. An echo detection and ranging system according to claim 1 in which said circuit means includes logic circuit means for changing the electrical supply conditions of said focus changing means in accordance with a predetermined relationship between the outputs of said receiver means and said pulse generator means.

6. An echo detection and ranging circuit according to claim 1 in which said circuit means comprises switch means for selectively supplying said focus changing means with either signals from manually actuated switches or signals from logic circuit means having logic inputs originating in said receiver means and said pulse generator means.

7. An echo detection and ranging system according to claim 1 in which said focusing transducer comprises a deformable electroacoustic array.

8. An echo detection and ranging system according to claim 1 in which said pulse generator means comprises a resistance means mechanically joined to said transducer means and electrically connected in circuit with said pulse generator means.

9. An echo detection and ranging system according to claim 8 in which said resistance means is of the strain gate type.

10. An acoustical echo detection and ranging system comprising:

clock circuit means having an output of pulses precisely regulated in frequency for synchronously triggering various components of said system;

transmitter means electrically joined to said clock circuit for producing, when triggered thereby, a burst of electrical energy of a high power and having a predetermined frequency;

transmit-receive switch means electrically connected to said transmitter means for establishing an electrical circuit between a first terminal thereon and said transmitter means in the presence of said bursts of high power electrical energy, and between said first terminal and a second terminal in the absence of said bursts of high power electrical energy;

deformable piezoelectric transducer means electrically connected to said first terminal of said transmit-receive switch means for converting said bursts of high power electrical energy to investigative bursts of acoustic energy of said predetermined frequency, for concentrating the energy density of said acoustic energy bursts to a predetermined energy level in a predetermined focal zone, and for converting returned acoustic reflections from said predetermined area to electrical signals;

receiver means electrically connected to said second terminal of said transmit-receive switch so as to be effectively joined to said transducer means in the absence of said bursts of high power electrical energy for suitably processing said electrical signals;

indicator means electrically connected to said clock circuit means and to said receiver means for displaying said electrical signals in time relationship to said transmitter output, so as to indicate the range of the source of said acoustical reflections;

focus means mechanically connected to said transducer means and effective to alter the degree of deformation thereof upon electrical excitation of a predetermined nature for changing the aforesaid focal zone of said transducer means;

dual pulse generator means, having inputs electrically connected to said clock circuit means and effectively connected to said transducer means and having outputs connected to said indicator means, for generating and supplying to said indicator means for display thereon an electrical pulse at a time interval corresponding to the range of the nearest boundary of said focal zone and a second electrical pulse at a time interval corresponding to the range of the further boundary of said focal zone;

logic circuit means having inputs connected to the outputs of said receiver means and said dual pulse generator means for supplying to said focus means electrical excitation of said predetermined nature to thereby cause focus change of said transducer means upon said received signal attaining a predetermined relationship with respect to said electrical pulse output of said dual pulse generator means; and selectively actuated means supplying manually initiated electrical excitation to said focus means in place of the electrical excitation supplied by said logic circuit means for manually focusing said transducer on predetermined zones within the operational range of said system.

* * * * *